Feb. 28, 1928.
G. T. SNELLING
SHOVEL BLADE AND SWEEP
Filed June 17, 1924
1,660,894
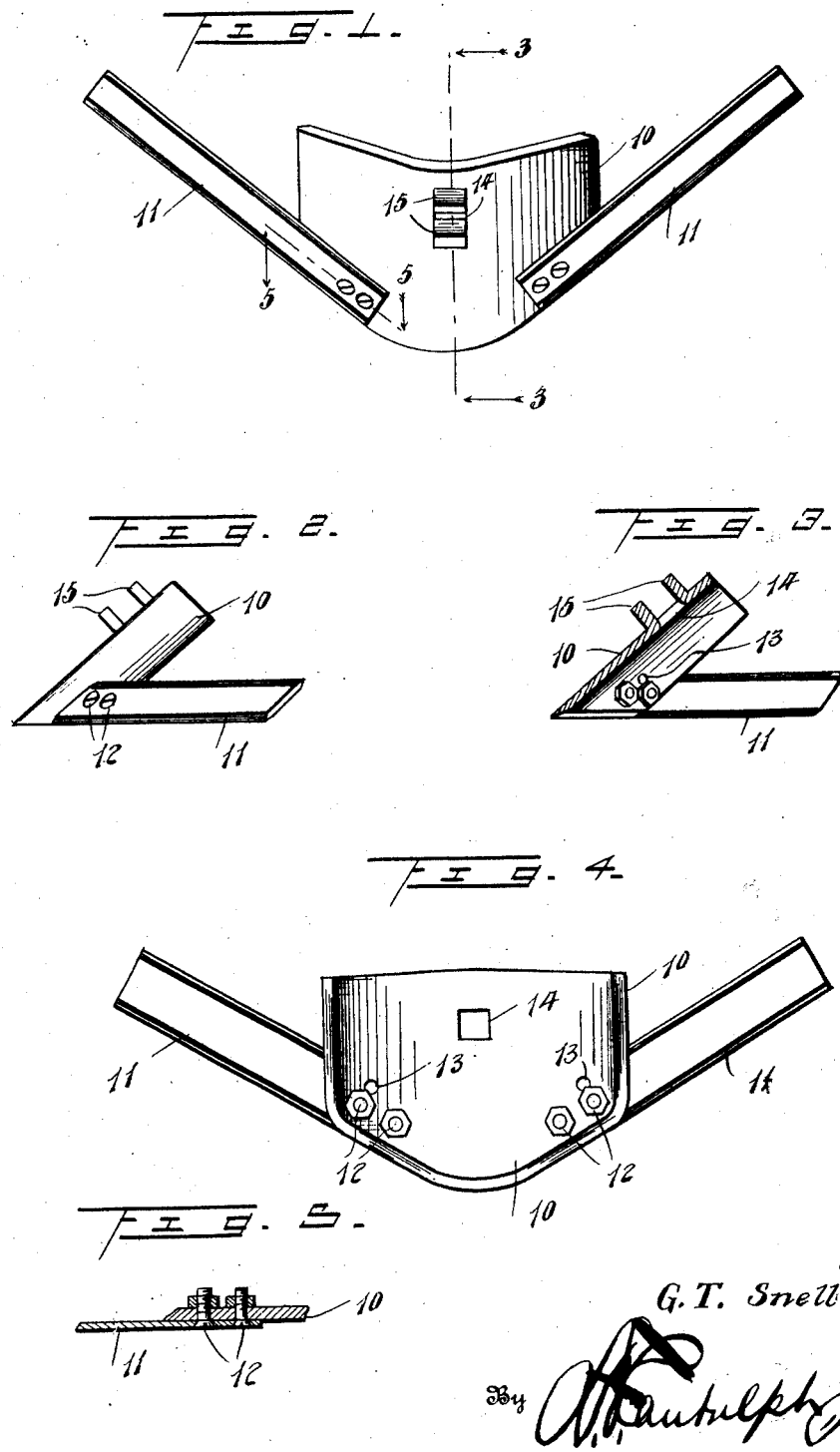
Inventor
G. T. Snelling.

Patented Feb. 28, 1928.

1,660,894

UNITED STATES PATENT OFFICE.

GEORGE T. SNELLING, OF TIGNALL, GEORGIA.

SHOVEL BLADE AND SWEEP.

Application filed June 17, 1924. Serial No. 720,629.

The invention relates to agricultural implements and more particularly to the shovel blade and sweep or scrape associated therewith, the purpose being to obviate frequent sharpening of the sweep or wings and to maintain them in predetermined shape, thereby saving time and cost and in consequence enabling a greater amount of work to be accomplished.

A further purpose of the invention is to relieve the strain on the heel bolt which connects the shovel blade to the standard, said blade being provided with reinforcements which enable an extended bearing upon the heel bolt.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a front view of a shovel blade and sweep embodying the invention,

Figure 2 is a side view thereof,

Figure 3 is a vertical longitudinal section on the line 3—3 of Figure 1,

Figure 4 is a rear view, and

Figure 5 a sectional detail on the line 5—5 of Figure 1.

Corresponding and like parts are referred to in the following description and designated in the several views of the drawings by like reference characters.

The numeral 10 denotes the shovel blade and 11 the sweeps or wings which are attached thereto by means of bolts 12, said wings being adjustable and reversible and sharpened at opposite edges to admit of sharp edges being brought into operative position when the edges in opposite positions have become dull. Each sweep or wing is connected to the blade 10 by two bolts, the forward bolt acting as a pivot when the angle of the blade is adjusted, and the rear bolt being adapted to engage one of a series of openings 13. In this manner each of the blades or wings is reversible and angularly adjustable.

The shovel blade 10 is provided with the usual opening 14 to receive the heel bolt by means of which it is connected to the standard or plow stock and in accordance with the present invention reinforcing projections 15 extend forwardly in line with opposite sides of the opening 14 and are adapted to obtain an extended bearing on the heel bolt to relieve strains thereon and insure a firm and bracing connection between the shovel blade and standard.

What is claimed is:—

A shovel blade provided with an opening adapted to receive a heel bolt fastening, said opening being adjacent the top and centered with respect to the sides of the blade, and reinforcing projections at the forward side of the blade adapted to obtain an extended bearing on the heel bolt fastening, said projections being arranged one above the other and integral with the blade, and said projections having their inner faces constituting two of the defining walls of said opening.

In testimony whereof I affix my signature.

GEORGE T. SNELLING.